United States Patent
Yoshinaga (10) Patent No.: US 8,713,212 B1
(45) Date of Patent: Apr. 29, 2014

(54) ELECTRONIC DEVICE, COMMUNICATION CONTROL METHOD OF ELECTRONIC DEVICE, AND INFORMATION TERMINAL DEVICE

(71) Applicant: Alpine Electronics, Inc., Tokyo (JP)

(72) Inventor: Takashi Yoshinaga, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 13/956,950

(22) Filed: Aug. 1, 2013

(30) Foreign Application Priority Data

Oct. 24, 2012 (JP) ................................. 20012-234548

(51) Int. Cl.
*G06F 13/14* (2006.01)

(52) U.S. Cl.
USPC .................................. 710/16; 710/64; 710/72

(58) Field of Classification Search
None
See application file for complete search history.

(56) References Cited

U.S. PATENT DOCUMENTS

| | | | | |
|---|---|---|---|---|
| 8,078,766 | B2 * | 12/2011 | Takenaka | 710/8 |
| 8,238,811 | B2 * | 8/2012 | Lydon | 455/3.03 |
| 8,332,843 | B2 * | 12/2012 | Hasegawa | 717/174 |
| 8,447,598 | B2 * | 5/2013 | Chutorash et al. | 704/231 |
| 8,509,738 | B2 * | 8/2013 | Cutts et al. | 455/411 |
| 8,570,168 | B2 * | 10/2013 | Logan et al. | 340/539.32 |
| 8,634,033 | B2 * | 1/2014 | Vanderwall et al. | 348/837 |
| 2009/0054069 | A1 * | 2/2009 | Calnan et al. | 455/445 |
| 2009/0307380 | A1 * | 12/2009 | Lee et al. | 710/14 |
| 2009/0307679 | A1 * | 12/2009 | Lee et al. | 717/168 |
| 2012/0324067 | A1 * | 12/2012 | Hari et al. | 709/222 |
| 2013/0288606 | A1 * | 10/2013 | Kirsch | 455/41.3 |

FOREIGN PATENT DOCUMENTS

| | | |
|---|---|---|
| JP | 2006-180356 | 7/2006 |
| JP | 2008-152404 | 7/2008 |

* cited by examiner

*Primary Examiner* — Cheng-Yuan Tseng
(74) *Attorney, Agent, or Firm* — Brinks Gilson & Lione (57) ABSTRACT

An electronic device includes a connection unit that enables a USB connection to a smartphone, a normal communication mode in which communication is performed by using a device class prepared in advance in the smartphone, a request unit that makes a request for switching to a unique communication mode, a search unit that searches for a device class usable in the normal communication mode after the request for switching to the unique communication mode has been made, a determination unit that determines, on the basis of a search result, whether or not a disadvantageous change has occurred in the normal communication mode, and a reset unit that resets the USB connection when it is determined that a disadvantageous change has occurred.

15 Claims, 10 Drawing Sheets

| MASS STORAGE | NCM | UNIQUE COMMUNICATION |
|---|---|---|
| 10 | 10 | 1 |

FIG. 9B

| MASS STORAGE | NCM | UNIQUE COMMUNICATION |
|---|---|---|
| 1 | 1 | 10 |

FIG. 9C

| MASS STORAGE | NCM | UNIQUE COMMUNICATION |
|---|---|---|
| 5 | 10 | 10 |

FIG. 9D

| | EXAMPLE IN FIG. 3A | EXAMPLE IN FIG. 3B | EXAMPLE IN FIG. 3C |
|---|---|---|---|
| TABLE A | NORMAL MODE | NORMAL MODE | NORMAL MODE |
| TABLE B | UNIQUE COMMUNICATION MODE | UNIQUE COMMUNICATION MODE | UNIQUE COMMUNICATION MODE |
| TABLE C | NORMAL/UNIQUE COMMUNICATION | UNIQUE COMMUNICATION MODE | NORMAL MODE |

ELECTRONIC DEVICE, COMMUNICATION CONTROL METHOD OF ELECTRONIC DEVICE, AND INFORMATION TERMINAL DEVICE

RELATED APPLICATION

The present application claims priority to Japanese Patent Application Number 2012-234548, filed Oct. 24, 2012, the entirety of which is hereby incorporated by reference.

BACKGROUND

1. Field of the Invention

The present invention relates to an electronic device, an information terminal device, and an electronic system utilizing them, and more particularly to communication control between the information terminal device and the electronic device when the information terminal device is connected.

2. Description of the Related Art

In recent years, with the ever widening use of multi-function mobile phones typified by smartphones or the like, the frequency of use of smartphones in vehicles has been increasing. A smartphone has communication functions, for example, a third generation (3G) line, a Universal Serial Bus (USB) connection, and wireless data communications, such as WiFi and Bluetooth (registered trademark). The use of these functions enables a voice call and data communication via the Internet or the like. As well as being used singly, the smartphone may be connected to an in-vehicle device and thereby may be remotely operated from the in-vehicle device, and the screen of the smartphone may be magnified and displayed on the display of the in-vehicle device.

The smartphone is connectable to the in-vehicle device by using a USB connection or other communication devices. USB is used as a standard interface for connecting between a personal computer (PC) and a peripheral device. In USB, specification groups called device classes, which are formed on the basis of the functions of peripheral devices, are defined. A unified control interface is prepared for devices made in accordance with each class specification, and devices complying with the class specification may be operated by a common device driver called a class driver. For example, a USB memory belongs to a mass storage class and may be operated without a driver being newly installed if an OS side has a class driver corresponding to the mass storage class.

In recent years, devices, such as MP3 players, implement the mass storage class, and devices, such as digital cameras, also implement a still image class, which is used when direct output to a printer is performed. Japanese Unexamined Patent Application Publication No. 2006-180356 discloses a USB peripheral device. In order to prevent a mistake in selecting a device class, when a USB host is connected, the USB peripheral device displays a desired device class among a plurality of device classes and prompts a user to select the displayed device class. In addition, in Japanese Unexamined Patent Application Publication No. 2008-152404, a user sets, among device classes supported by a USB host control unit, a connection-target class whose connection is permitted, and when a USB device is connected, the connection of only the USB device whose device class matches the connection-target class set by the user is permitted. Thus, in the case where an electronic apparatus and a plurality of device class USB devices are connected and used, a connection with an appropriate class may be made at all times.

Figure 1:
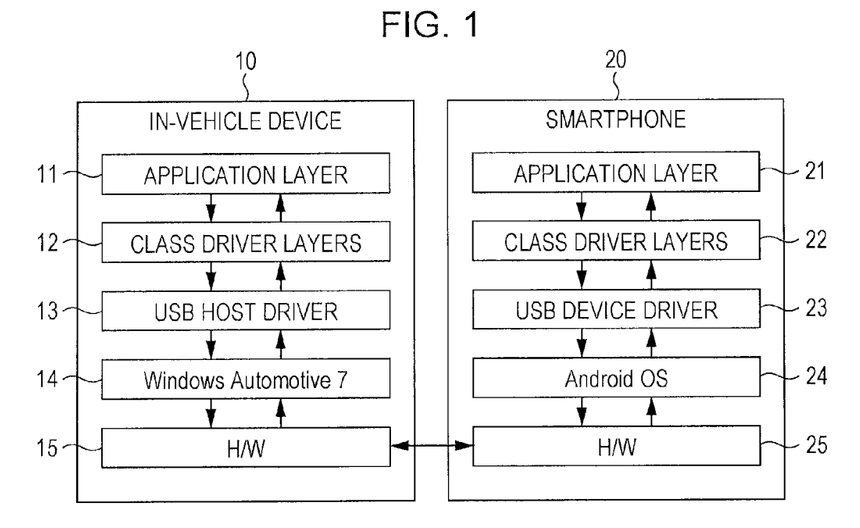
FIG. 1 illustrates an example of a configuration of layers of an in-vehicle device and a smartphone.

In a smartphone, such as an Android terminal, in order to increase flexibility in a method of communication with peripheral devices, switching between functions of a USB bus enables switching to a mode that performs free communication using its own unique protocol (hereinafter referred to as a unique communication mode) (for example, Android open accessory protocol). FIG. 1 illustrates a configuration of layers of an in-vehicle device and a smartphone. Although both of an in-vehicle device 10 and a smartphone 20 may be a USB host or a USB peripheral device, the in-vehicle device 10 is the USB host and the smartphone 20 is the USB peripheral device here.

The in-vehicle device 10 includes, in sequence from a high level, an application layer 11, class driver layers 12, a USB host driver 13, a Windows Automotive 7 operating system (OS) 14, hardware 15 and so forth. On the other hand, the smartphone 20 includes, in sequence from a high level, an application layer 21, class driver layers 22, a USB device driver 23, an Android OS 24, and hardware 25. In the class driver layers 22 of the smartphone 20, for example, a mass storage class and a communication device class (NCM) are prepared. In the USB host driver 13 of the in-vehicle device 10, drivers for operating the mass storage class, the communication device class (NCM), and the like are prepared.

Figure 2:
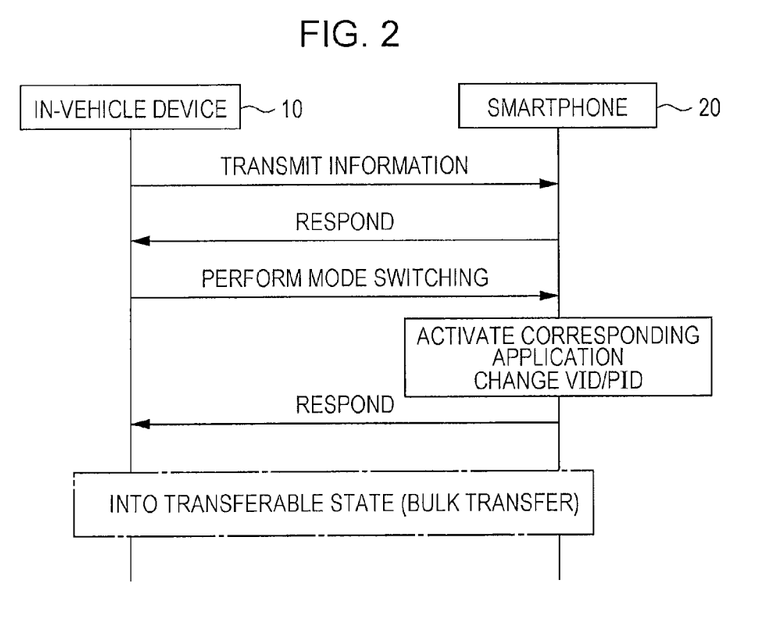
FIG. 2 illustrates an operation sequence performed when a USB bus of the smartphone is switched to a unique communication mode in the case where the in-vehicle device and the smartphone are connected with a USB cable.

FIG. 2 illustrates an operation sequence performed when a USB bus is switched from a normal communication mode to a unique communication mode. When the in-vehicle device 10 and the smartphone 20 are connected with a USB cable, in the case where the in-vehicle device 10 operates as a USB host and the smartphone 20 operates as a USB peripheral device, for example, the in-vehicle device 10 transmits a music play command to the smartphone 20 and the smartphone 20 transfers audio data to the in-vehicle device 10 in response to this command. The in-vehicle device 10 outputs the received audio data by using its own amplifier and speaker.

Now, when the in-vehicle device 10 requests switching to the unique communication mode in which a unique control command may be utilized, the smartphone 20 activates a corresponding application, changes a vender ID (VID)/product ID (PID), and thereby switches the USB bus from the communication mode utilizing a normal device class to the unique communication mode. This enables communication between the in-vehicle device 10 and the smartphone 20 with a free protocol. However, because this unique communication mode is not a function implemented in a device class/class driver of an individual terminal but a special communication mode prepared on the OS side, a case may arise where a USB interface (device class) originally included by the terminal may not be able to be used. For example, a mirror link, and an operation, such as playing of a music file, may be disabled.

When the in-vehicle device 10 and the smartphone 20 are connected to each other, a mirror link has the highest priority. The mirror link causes the in-vehicle device 10 to serve just like an input/output device of the smartphone 20. The same picture as that displayed on the screen of the smartphone 20 may be magnified and displayed on the display of the in-vehicle device 10, and the smartphone 20 may be remotely operated by input via a touch panel or the like of the in-vehicle device 10.

Figure 3A:
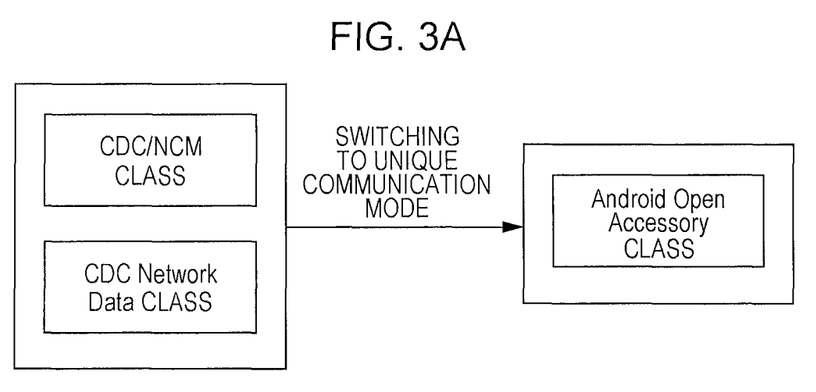
FIGS. 3A to 3C illustrate examples of device classes usable as USB interfaces before and after switching to the unique communication mode.

FIG. 3A illustrates an example where the mirror link becomes disabled. Before switching to the unique communication mode, a CDC/NCM class and a CDC network data class used for the mirror link are allocated as usable USB interfaces. However, when switching to the unique communication mode is performed, the smartphone 20 erases the CDC/NCM class and the CDC network data class, and changes the classes serving as the usable USB interfaces to an Android open accessory class. Thus, the mirror link becomes disabled.

Figure 3B:
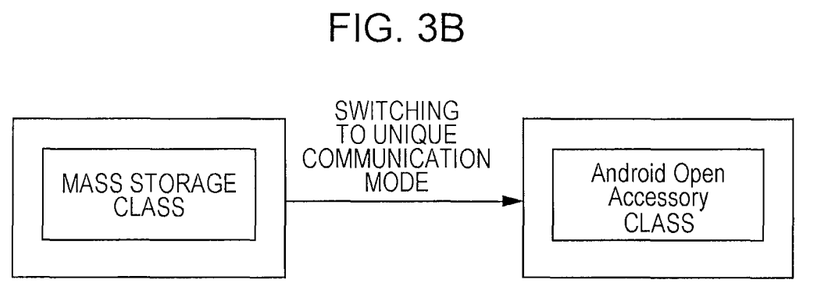

FIG. 3B illustrates an example where playing of a music file becomes disabled. Before switching to the unique communication mode, the music file of the smartphone 20 may be played by using the mass storage class as a USB interface. However, when switching to the unique communication mode is performed, the mass storage class disappears from the USB interface of the smartphone 20, and a usable class is changed to the Android open accessory class. Thus, playing of the music file becomes disabled.

Figure 3C:
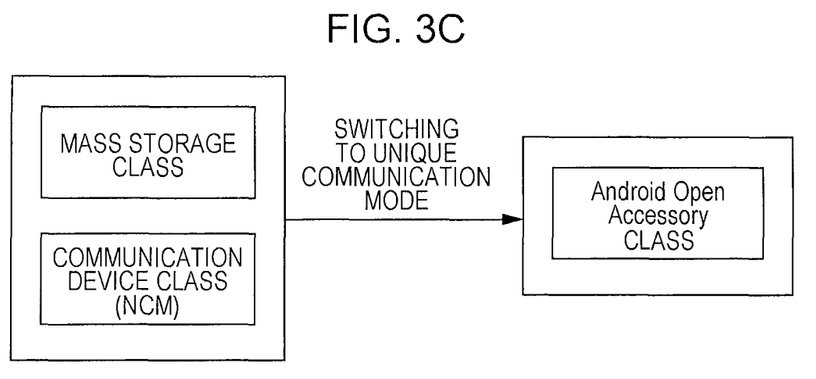

FIG. 3C illustrates an example where playing of a music file and the mirror link become disabled. Before switching to the unique communication mode, the music file may be played by using the mass storage class as a USB interface, and the mirror link is enabled by the communication device class (NCM). However, when switching to the unique communication mode is performed, the mass storage class and the communication device class (NCM) disappear and are changed to the Android open accessory class, so that playing of the music file and the mirror link become disabled.

Hence, switching from a normal mode utilizing a device class, which has been prepared in advance and serves as a USB interface, to a unique communication mode using a unique protocol disables an existing function. In this case, it is desirable to evaluate functions of the normal mode and the unique communication mode and enable selection of communication using a more highly evaluated mode.

An object of embodiments of the present invention is to provide an electronic device that enables selection of either a normal mode or a unique communication mode, a communication control method of the electronic device, a communication control program of the electronic device, an electronic system, and an information terminal device.

In addition, an object of embodiments of the present invention is to provide an electronic device that enables assignment of a unique communication command to another alternative connection properly in the case where a normal mode command and the unique communication command may not be able to coexist in the same bus, a communication control method of the electronic device, and an information terminal device.

SUMMARY

An embodiment of the present invention in one aspect provides an electronic device that is connectable to an information terminal device. The electronic device includes a connection unit that enables a USB connection to the information terminal device, a first communication mode in which communication with the information terminal device is performed by using a device class prepared in advance in the information terminal device, a request unit that makes a request to the information terminal device for switching to a second communication mode which is different from the first communication mode, a search unit that searches for a device class usable in the first communication mode after the request for switching to the second communication mode has been made, a determination unit that determines, on the basis of a search result of the search unit, whether or not a disadvantageous change has occurred in the first communication mode, and a reset unit that enables a reset of the connection unit when the determination unit determines that a disadvantageous change has occurred.

The electronic device preferably further includes an alternative connection information acquisition unit that acquires alternative connection information regarding a connection which is able to be used instead of the USB connection, and an alternative connection unit that enables an alternative connection to the information terminal device on the basis of the alternative connection information after the reset unit has performed the reset.

The reset unit preferably includes a warning requesting a user to unplug and plug the connection unit. Preferably, a determination table indicating a weight of a device class is prepared in advance and the determination unit determines whether or not a disadvantageous change has occurred with reference to the determination table. When a device class having been used before switching to the second communication mode becomes unusable, the determination unit preferably determines that a disadvantageous change has occurred. When the number of device classes usable before switching to the second communication mode decreases after switching to the second communication mode, the determination unit preferably determines that a disadvantageous change has occurred. The first communication mode preferably reestablishes communication using the first communication mode after the reset unit has performed the reset. The electronic device preferably operates with a mirror link by using the first communication mode.

An embodiment of the present invention in another aspect provides a communication control method for an electronic device that is connectable to an information terminal device. The communication control method includes the steps of: making a USB connection to the information terminal device; communicating with the information terminal device by using a device class prepared in advance in the information terminal device in a first communication mode; making a request to the information terminal device for switching to a second communication mode which is different from the first communication mode; searching for a device class usable in the first communication mode after making the request for switching to the second communication mode; determining, on the basis of a search result, whether or not a disadvantageous change has occurred in the first communication mode; and enabling a reset of the USB connection when it is determined that a disadvantageous change has occurred.

An embodiment of the present invention in another aspect provides a communication control program executed by an electronic device that is connectable to an information terminal device. The communication control program includes the steps of: making a USB connection to the information terminal device; communicating with the information terminal device by using a device class prepared in advance in the information terminal device in a first communication mode; making a request to the information terminal device for switching to a second communication mode which is different from the first communication mode; searching for a device class usable in the first communication mode after making the request for switching to the second communication mode; determining, on the basis of a search result, whether or not a disadvantageous change has occurred in the first communication mode; and enabling a reset of the USB connection when it is determined that a disadvantageous change has occurred.

An embodiment of the present invention in another aspect provides an electronic system. The electronic system includes an electronic device having the above-described features and an information terminal device that is connected to the electronic device via the connection unit. In the electronic system, the information terminal device activates an application in response to the request for switching to the second communication mode, and the application notifies the electronic device of the alternative connection information. The information terminal device preferably communicates with the electronic device by using the first communication mode and the alternative connection unit after the connection unit has been reset.

An embodiment of the present invention in another aspect provides an information terminal device that is connectable to an electronic device. The information terminal device includes a connection unit that enables a USB connection to the electronic device, a first communication mode in which communication with the electronic device is performed by using a device class prepared in advance, a second communication mode that enables communication in the second communication mode in response to a request from the electronic device for switching to the second communication mode which is different from the first communication mode, a providing unit that provides, to the electronic device, in response to the request for switching to the second communication mode, alternative connection information regarding an alternative connection which is able to be made, and a communication unit that enables communication using the first communication mode and communication using an alternative connection unit between the information terminal device and the electronic device after the connection unit has been reset.

The information terminal device preferably further includes a response application that is activated in response to the request for switching to the second communication mode, and the response application executes the providing unit and the communication unit. The response application is preferably acquired from an external server in response to the request for switching to the second communication mode.

According to embodiments of the present invention, it is determined whether or not a disadvantageous change has occurred in a first communication mode, and when a disadvantageous change has occurred, a USB connection may be reset, thereby facilitating selection of the first communication mode. In addition, an alternative connection may be made, thereby enabling both communication using the first communication mode and communication using a second communication mode at the same time. Thus, a disadvantageous change due to switching to the second communication mode may be dealt with.

DETAILED DESCRIPTION OF THE PRESENTLY PREFERRED EMBODIMENTS

Embodiments for carrying out the present invention will be described in detail below with reference to the drawings. Here, as a preferred example, an in-vehicle electronic system including an in-vehicle device and a smartphone connected to the in-vehicle device is provided. Note that the present invention is not limited to such an in-vehicle electronic system that connects between the in-vehicle device and the smartphone. The in-vehicle device is an electronic device installed on a vehicle, and functions included therein are not particularly limited. Examples of the functions may include an audio and video playing function, a digital terrestrial television broadcast receiving function, a navigation function, and a data communication function. A device connected to the in-vehicle device is not limited to the smartphone, and other terminal devices may be used. Examples of the device may include a portable personal computer, a tablet PC, and a portable information processing apparatus.

Embodiments

Figure 4:
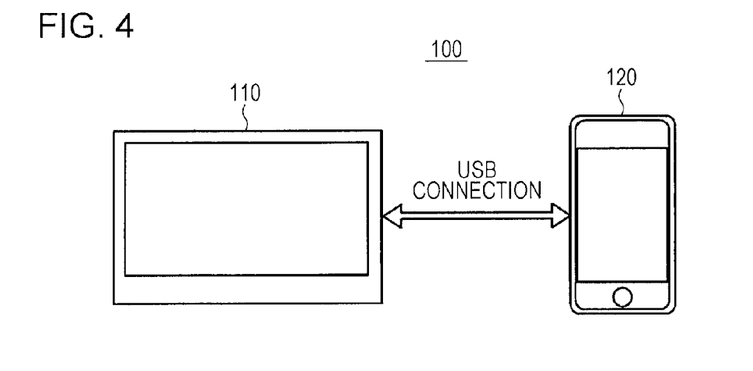
FIG. 4 illustrates the configuration of an in-vehicle electronic system according to embodiments of the present invention.

FIG. 4 illustrates an example of an in-vehicle electronic system 100 according to the embodiments of the present invention. An in-vehicle device 110 is an electronic device installed on a vehicle and may have a media playing function, a television receiving function, and/or a data communication function. A smartphone 120 is connectable to the in-vehicle device 110 by using a USB cable or another communication unit. When the smartphone 120 is connected to the in-vehicle device 110 with the USB cable in the embodiments, an example where the in-vehicle device 110 operates as a USB host and the smartphone 120 operates as a USB peripheral device is provided.

When a USB connection between the in-vehicle device 110 and the smartphone 120 is made, the in-vehicle device 110 may operate the smartphone 120 by using a class driver corresponding to a device class which has been prepared in advance in the smartphone 120 and which serves as a USB interface. For example, the in-vehicle device 110 and the smartphone 120 constitute a mirror link and the in-vehicle device 110 thereby may display image data transferred from the smartphone 120 on its own display and give input to the smartphone 120 by using an input interface of the in-vehicle device 110. In addition, an instruction to play a desired music file stored in the smartphone 120 may be given by a command from the in-vehicle device 110, and the in-vehicle device 110 may output from its own speaker audio data transferred from the smartphone 120.

Figure 5:
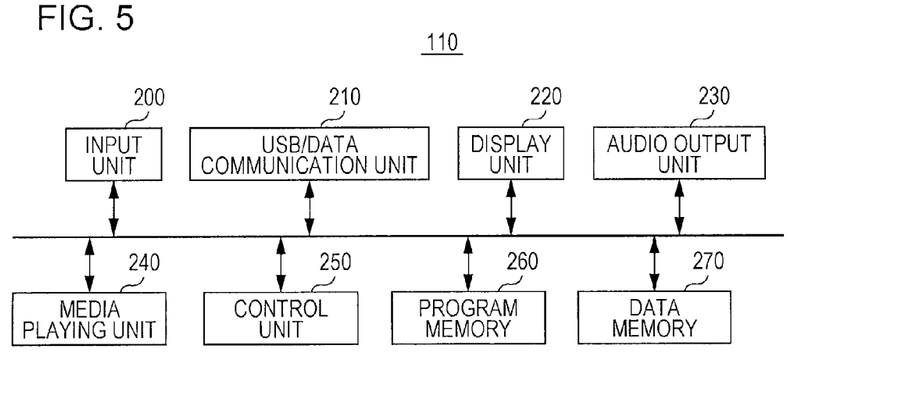
FIG. 5 is a block diagram illustrating a typical configuration of an in-vehicle device illustrated in FIG. 4.

FIG. 5 is a block diagram illustrating an example of a typical configuration of the in-vehicle device 110. The in-vehicle device 110 includes an input unit 200 that receives input from a user, a USB/data communication unit 210 that enables a communication connection to an external device, such as the smartphone 120, a network, and so forth, a display unit 220, an audio output unit 230 that outputs audio, a media playing unit 240 that plays audio and video data, a control unit 250 that controls each unit, a program memory 260 that stores program data, and a data memory 270 that stores various pieces of data.

Examples of the input received by the input unit 200 preferably include input via a remote control, input via a cursor, and input to a display via a touch panel. The USB/data communication unit 210 enables a USB connection to the smartphone 120 and further includes wired and wireless communication units, such as WiFi, Bluetooth (registered trademark), a local area network (LAN), and a wireless LAN. As illustrated in FIG. 1, the program memory 260 stores, for example, Windows Automotive 7 as an OS for controlling each unit. The program memory 260 also stores a class driver for operating the smartphone 120 in accordance with a device class prepared in the smartphone 120 when the smartphone 120 is connected as a USB peripheral device. In addition, in the embodiments, the program memory 260 stores a communication control program executed when switching to a unique communication mode is performed in the smartphone 120. The control unit 250 includes a processing device, such as a central processing unit (CPU) or a microcontroller, and loads and executes the program data stored in the program memory 260 so as to control each unit.

Figure 6:
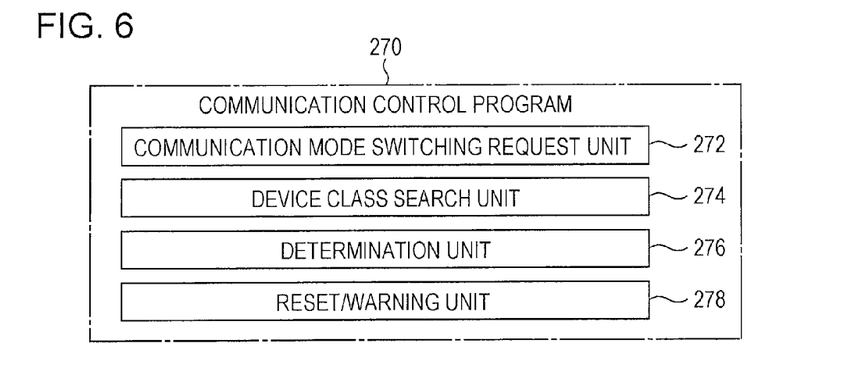
FIG. 6 is a block diagram illustrating a functional configuration of a communication control program of the in-vehicle device.

FIG. 6 is a functional block diagram illustrating the communication control program according to the embodiments. A communication control program 270 according to the embodiments controls communication performed when the in-vehicle device 110 makes a request to the smartphone 120 for switching to the unique communication mode using a unique protocol in a state where a USB connection between the in-vehicle device 110 and the smartphone 120 is made. As illustrated in FIG. 6, the communication control program 270 includes a communication mode switching request unit 272 that requests switching to the unique communication mode, a device class search unit 274 that searches for a device class usable after the switching request has been made, a determination unit 276 that determines, on the basis of the searched device class, whether or not a disadvantageous change has occurred due to switching of a communication mode, a reset/warning unit 278 that performs a bus reset or provides a warning on the basis of a determination result of the determination unit 276. These operations will be described later in detail.

Figure 7:
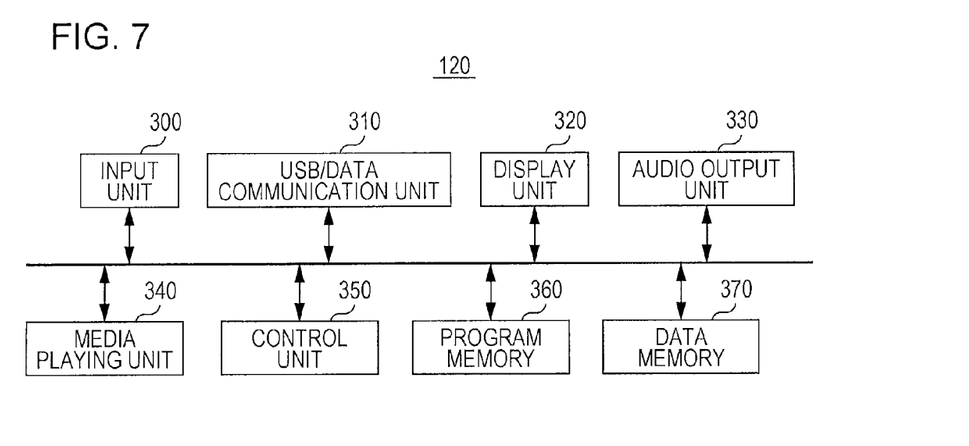
FIG. 7 is a block diagram illustrating a typical configuration of a smartphone.

FIG. 7 is a block diagram illustrating an example of a typical configuration of the smartphone 120. The smartphone 120 includes an input unit 300 that receives input from the user, a USB/data communication unit 310 that enables a communication connection to an external device, such as the in-vehicle device 110, a network, and so forth, a display unit 320, an audio output unit 330 that outputs audio, a media playing unit 340 that plays audio and video data, a control unit 350 that controls each unit, a program memory 360 that stores program data, and a data memory 370 that stores various pieces of data. The smartphone 120 further includes a voice call function, which is not illustrated.

Examples of the input received by the input unit 300 preferably include input to a display via a touch panel and input via voice. The USB/data communication unit 310 enables a USB connection to the in-vehicle device 110 and further includes wired and wireless communication units, such as WiFi, Bluetooth (registered trademark), a LAN, and a wireless LAN. As illustrated in FIG. 1, the program memory 360 stores, for example, Android OS as an OS for controlling each unit. The program memory 360 also stores a device class for enabling the smartphone 120 to operate as a USB peripheral device. The control unit 350 includes a processing device, such as a central processing unit (CPU) or a microcontroller, and loads and executes the program data stored in the program memory 360 so as to control each unit.

Figure 8:
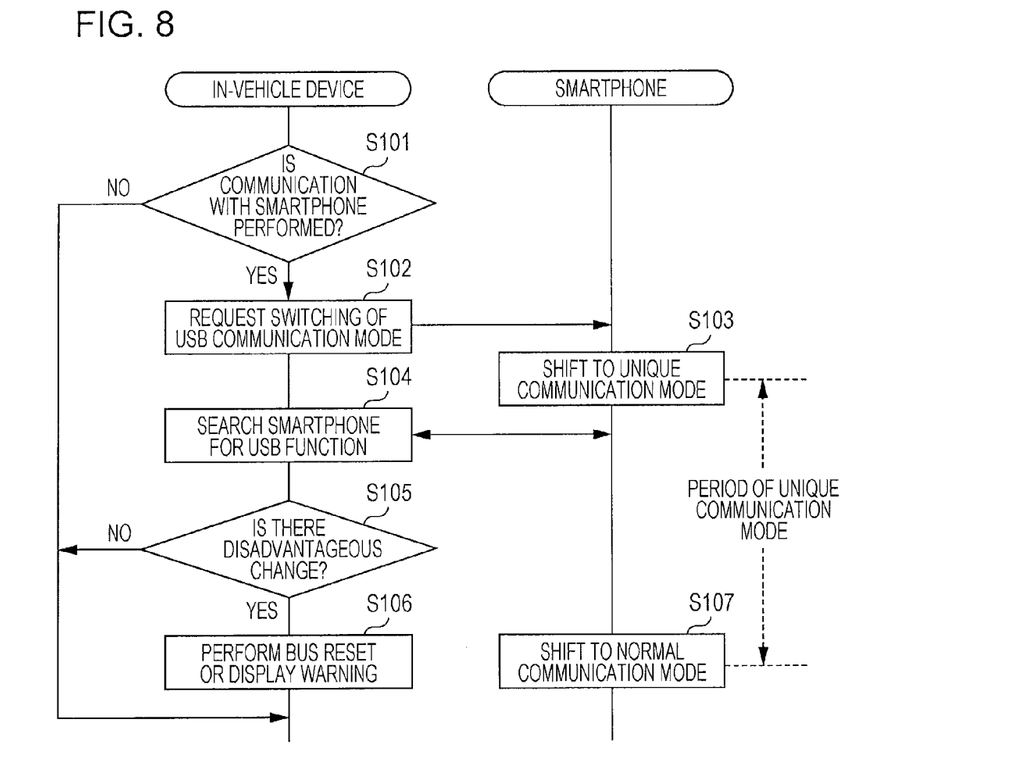
FIG. 8 is a flowchart illustrating communication control performed when switching to a unique communication mode is performed in the in-vehicle electronic system.

Next, communication control performed by the in-vehicle electronic system 100 according to a first embodiment of the present invention will be described. FIG. 8 is a flowchart illustrating communication control performed when switching to the unique communication mode is performed in the in-vehicle electronic system 100. When the smartphone 120 is connected to the in-vehicle device 110 via the USB cable, the in-vehicle device 110 automatically detects that the smartphone 120 has been connected as a USB peripheral device and acquires a descriptor defining details of a USB interface from the smartphone 120. A device class usable in the smartphone 120 may be identified by using the descriptor. The in-vehicle device 110 interprets the descriptor, thereby recognizes a device class required for the operation performed by the smartphone 120, and loads a class driver corresponding to the device class. This enables USB communication between the in-vehicle device 110 and the smartphone 120 by using a communication protocol of the device class (S101).

In the in-vehicle device 110, when communication using a unique control command using a communication protocol other than that of a device class prepared in the smartphone 120 is performed, or when a function other than that supported by the device class is performed, the communication mode switching request unit 272 transmits, to the smartphone 120, a command for requesting switching the USB communication from a normal mode to the unique communication mode (S102).

The smartphone 120 shifts to the unique communication mode using a unique protocol in response to the command of the switching request (S103). For example, in the case of Android OS, an Android open accessory protocol is used. When the request for switching of the communication mode is made, the device class search unit 274 subsequently searches the smartphone 120 for a USB function (S104). That is, the device class search unit 274 searches for a device class usable in the smartphone 120 after switching to the unique communication mode. Through this search, the descriptor is reacquired from the smartphone 120 and the usable device class is thereby checked again. This search result is held in a memory or the like.

Then, the determination unit 276 determines, on the basis of the search result, whether or not a disadvantageous change has occurred due to switching to the unique communication mode (S105). In a method of determining whether or not the change is disadvantageous, a device class usable before switching to the unique communication mode is compared with a device class usable after switching to the unique communication mode, and, for example, when the number of device classes decreases by a given number or more, it may be determined that a disadvantageous change has occurred. Alternatively, when a device class having been used before switching to the unique communication mode is continuously usable after the switching, it is determined that there is no disadvantageous change, and when the device class is unusable, it is determined that there is a disadvantageous change.

Furthermore, a determination table indicating a weight of a device class may be prepared in advance and the determination unit 276 may determine whether or not the change is disadvantageous with reference to this determination table. The determination table is preferably made with the following elements, a degree of importance is assigned with respect to each element, and it is evaluated whether the use of the smartphone 120 in a state where switching to the unique communication mode has not been performed is useful or whether the use in a state where the switching has been performed is useful.

Figure 9A:
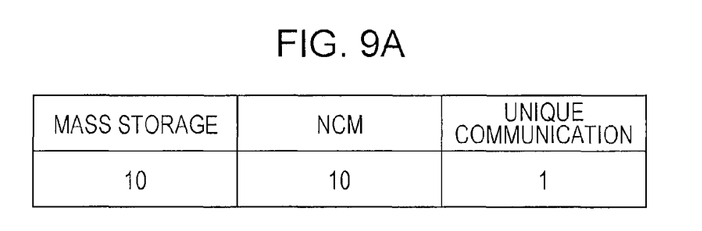
FIGS. 9A to 9C illustrate examples of determination tables used for determining whether or not a disadvantageous change has occurred.

Functions of in-Vehicle Device
Readiness or non-readiness for a mirror link
Capability or incapability of playing music stored in a mass storage
Capability or incapability of performing communication by using another communication bus as an alternative
User's Preferences
Whether or not to listen to music stored in a smartphone
Whether or not to use a mirror link
Whether or not to use communication uniquely defined by a manufacturer Examples of Determination: A determination table in which each function is graded by using the determination elements is prepared in advance, and it is determined whether or not the unique communication mode is to be used. FIG. 9A illustrates a determination table A. The determination table A indicates weights assigned in the case where an in-vehicle device additionally has another communication bus, such as WiFi or Bluetooth (registered trademark), and in the case where a mass storage class or a mirror link is likely to be used for playing of music and so forth. USB communication makes setting easier than setting in wireless communication, such as WiFi or Bluetooth (registered trademark), and enables stable communication. Hence, although a unique communication mode is graded the low point value "1", the assignment of not the value "0" but of the value evaluated to some degree is considered appropriate.

Figure 9B:
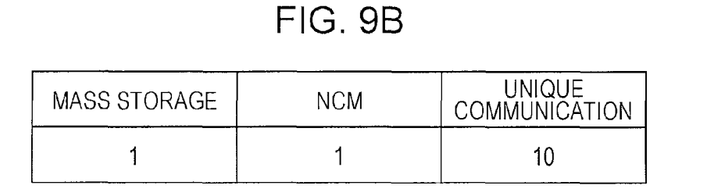

FIG. 9B illustrates a determination table B. The determination table B indicates weights assigned in the case where the in-vehicle device does not additionally have a communication bus and in the case where the user does not place a high priority on the mirror link or playing of music using the mass storage class serving as a USB interface. In this case, a mass storage class and an NCM class are each graded the point value "1" and the unique communication mode is graded the high point value "10".

Figure 9C:
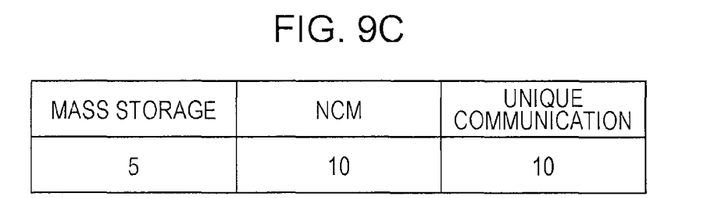

FIG. 9C illustrates a determination table C. The determination table C indicates weights assigned in the case where the in-vehicle device does not additionally have a communication bus and in the case where the mass storage class or the mirror link is likely to be used for playing of music and so forth.

Figure 9D:
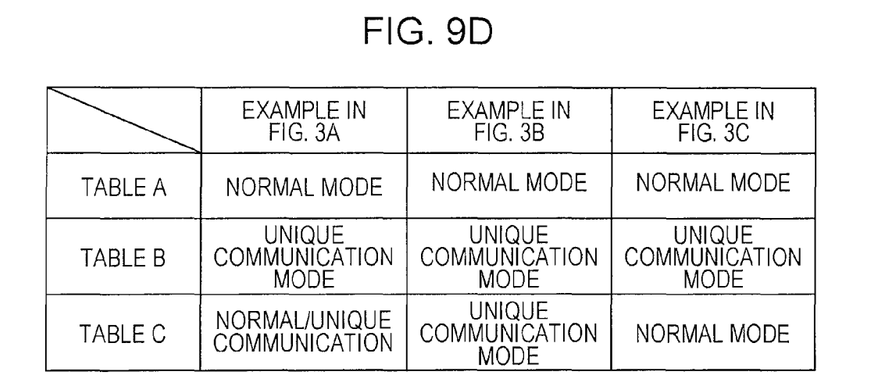
FIG. 9D illustrates examples of determination results based on the determination tables.

FIG. 9D illustrates results obtained by determining the examples where playing of a music file or the mirror link becomes disabled in FIGS. 3A to 3C with the determination tables A to C. A "normal mode" in FIG. 9D is a communication mode in which a device class serving as a USB interface is used, that is, in which USB communication before switching to the unique communication mode is performed. Because a point value corresponding to the CDC network data class in FIG. 3A is not prepared in the determination tables A to C, in the determination using the determination table C, an evaluation point value is assigned "10" and is equal to the point value of the unique communication mode. In this case, either the normal mode or the unique communication mode is decided by using other determination elements. Thus, the functions of the normal mode and the unique communication mode are evaluated by using the determination tables reflecting the functions of the in-vehicle device and the user's preference, so that it may be determined whether or not the change is disadvantageous.

Referring back to the flow in FIG. 8, when the determination unit 276 determines that there is no disadvantageous change, the unique communication mode continues. For example, in the unique communication mode, the smartphone 120 may be caused to perform an operation, such as e-mail acquisition, by using a unique command. On the other hand, when the determination unit 276 determines that there is a disadvantageous change, the reset/warning unit 278 performs a bus reset or displays a warning for the bus reset (S106).

The reset/warning unit 278 performs the bus reset of the USB connection so that the smartphone 120 terminates the unique communication mode. The bus reset is performed by grounding a D+ terminal and a D− terminal of the USB cable. Alternatively, the reset/warning unit 278 provides a warning prompting the user to unplug and plug the USB cable once. When the user plugs the USB cable in again, the USB connection is reset. The warning may also indicate, for example, that switching of the communication mode has disabled an existing function, or that a reset of the USB connection or initialization is required so as to continuously use a function having been used until now. Hence, when it is determined that a disadvantageous change has occurred, the USB communication with the smartphone 120 may be readily returned from the unique communication mode to the normal mode (S107).

Figure 10:
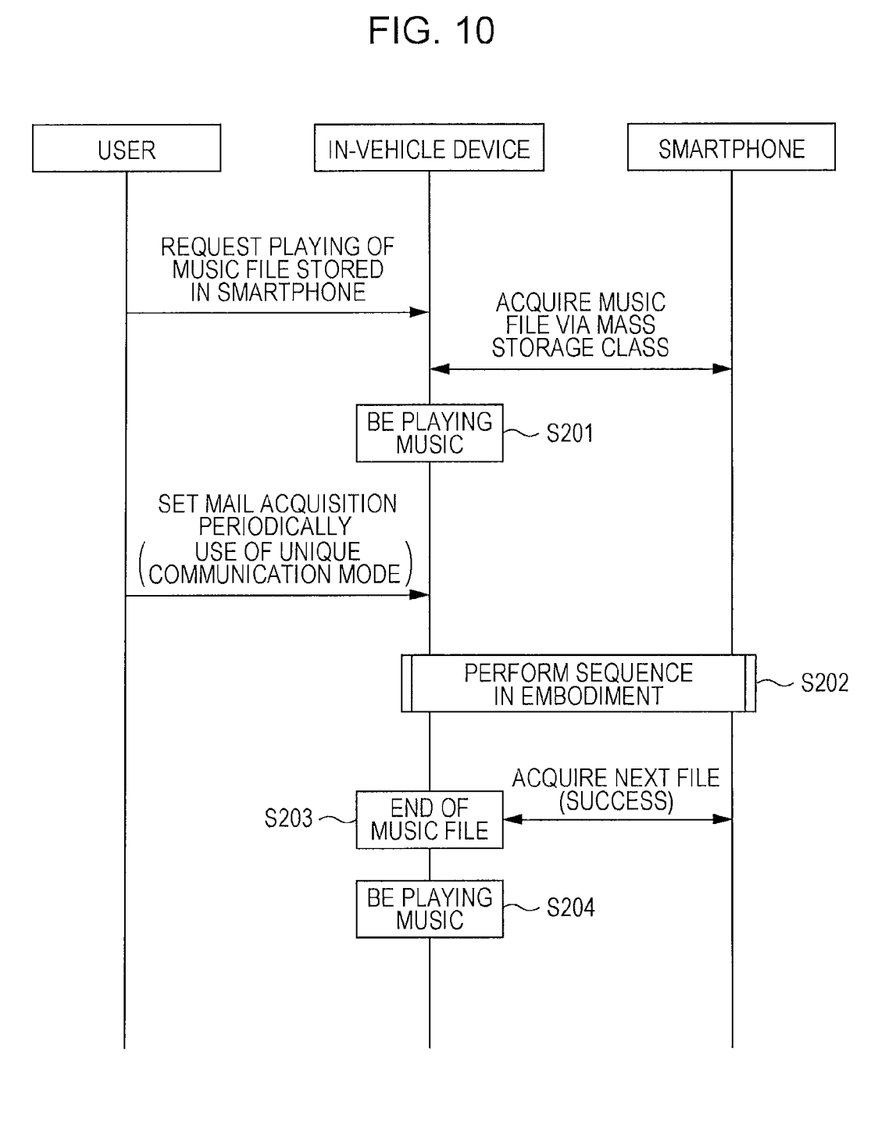
FIG. 10 is a flowchart illustrating an example of the communication control performed by the in-vehicle electronic system according to an embodiment.

Next, FIG. 10 illustrates a specific operation performed by the in-vehicle electronic system 100 to which the communication control according to this embodiment is applied. FIG. 10 illustrates an example of the operation performed in the case where e-mail acquisition from a smartphone is periodically set while a mass storage class is in use and music is being played. The user inputs an instruction to request the in-vehicle device 110 to play a music file stored in the smartphone 120. In the case of a mirror link, this instruction is transferred to the smartphone 120 via the in-vehicle device 110. The in-vehicle device 110 receives audio data of the music file from the smartphone 120 by using the mass storage class and plays the music file (S201). When e-mail acquisition is performed while the music file is being played, the in-vehicle device 110 makes a request to the smartphone 120 for switching to the unique communication mode because a mail acquisition operation is performed by using a unique control command. Subsequently, the communication control sequence illustrated in FIG. 8 is performed between the in-vehicle device 110 and the smartphone 120, and it is determined, for example, whether or not a disadvantageous change has occurred (S202).

Here, because the function currently in use is lost, it is determined that a disadvantageous change has occurred. As a result, the in-vehicle device 110 performs a bus reset and terminates the unique communication mode between it and the smartphone 120. Thus, the USB communication between the in-vehicle device 110 and smartphone 120 is returned to the normal mode. This processing is performed with the operation of playing the music file being performed in the background. In the in-vehicle device 110, when the operation reaches the end of the music file being played or a certain point before the end (S203), the in-vehicle device 110 successfully acquires a next music file from the smartphone 120 by using the mass storage class and subsequently plays the next music file (S204).

Figure 11:
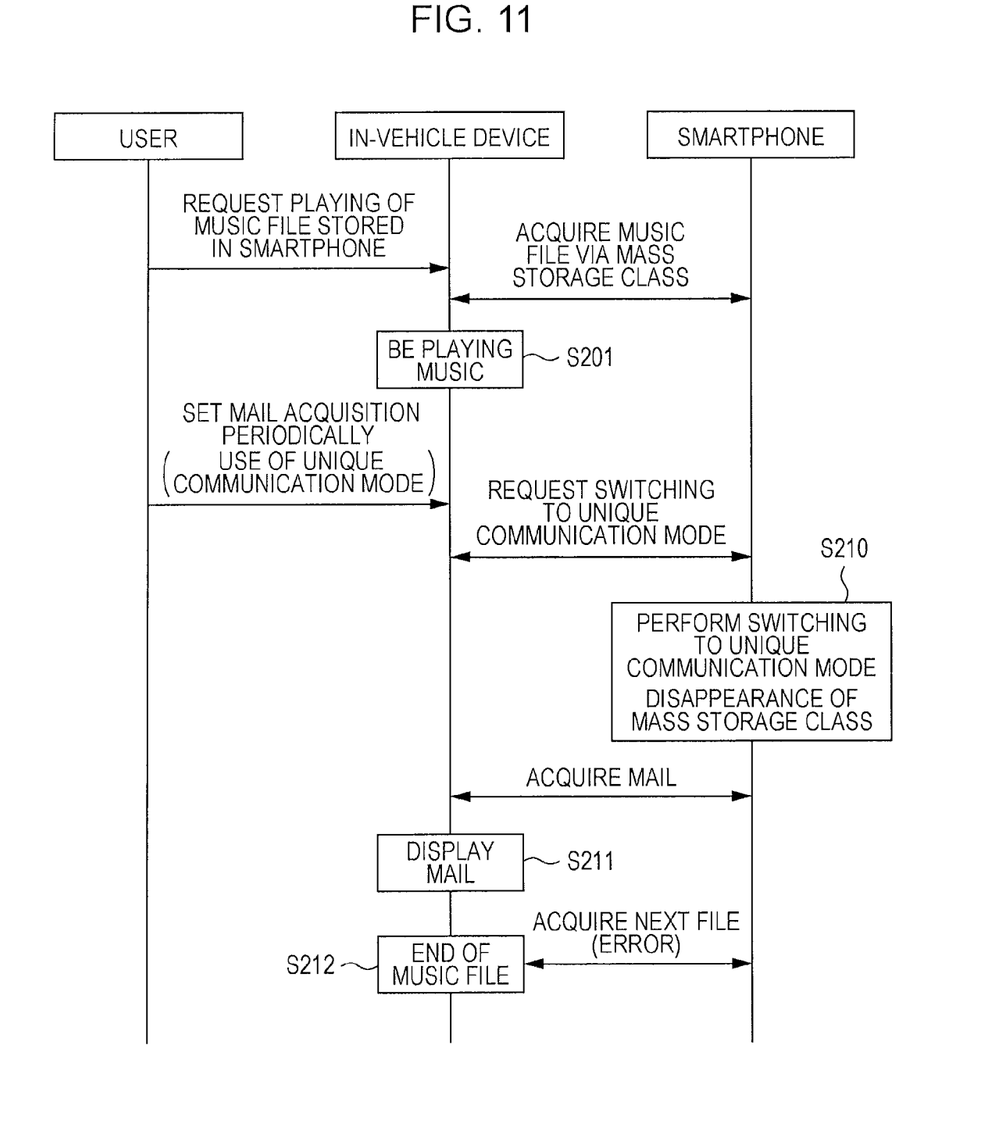
FIG. 11 is a flowchart illustrating an example of communication control performed by the in-vehicle electronic system when the communication control according to this embodiment is not used.

FIG. 11 illustrates a flow performed in the case where the communication control according to this embodiment is not performed in the example in FIG. 10. When a request for switching to the unique communication mode is made so as to periodically acquire mail while music is being played, the smartphone 120 performs switching to the unique communication mode. As a result, the mass storage class disappears and becomes unusable (S210). Then, in the unique communication mode, mail is acquired from the smartphone 120 and the mail is displayed on the display of the in-vehicle device 110 (S211). In the in-vehicle device 110, when the operation reaches the end of the music file being played or a certain point before the end (S212), the in-vehicle device 110 attempts to acquire a next music file from the smartphone 120. However, an acquisition error occurs because the mass storage class has disappeared or has been unusable, so that music may not be able to be played. If the user prefers e-mail acquisition to playing of music, the continuation of such a unique communication mode presents no problem. However, if the user places a higher priority on playing of music than on e-mail acquisition, the continuation makes the user feel uncomfortable.

In this way, in this embodiment, when the in-vehicle device 110 causes the smartphone 120 to perform switching of the communication mode, the in-vehicle device 110 stores functions usable before and after the switching and determines whether or not the smartphone 120 is to be used in the unique communication mode. When the in-vehicle device 110 determines that the smartphone 120 is to be used in the normal mode, the in-vehicle device 110 resets the bus or displays a dialog box in which the user is prompted to unplug and plug a connector. In the determination whether or not the smartphone 120 is to be used in the unique communication mode, for example, evaluation is made by grading the functions before and after the switching on the basis of the functions of the in-vehicle device 110 and user's settings and preferences. By using such a configuration, communication with a smartphone in a mode having superiority over other modes may be selected for a terminal, such as an Android terminal, having its own unique communication mode switching function in accordance with a function of an in-vehicle device and user's preferences.

Next, a second embodiment of the present invention will be described. In a smartphone, such as an Android terminal, communication, such as communication using a mirror link to which Virtual Network Computing (VNC) is applied in order to interact with an in-vehicle device, may be performed. However, because an operating system defined in the smartphone is basically used, the smartphone has not been optimized for control from the in-vehicle device. Thus, in order to perform a unique operation, a unique communication mode using a unique control command is effective.

Although a mirror link is usable in communication using WiFi, Bluetooth (registered trademark), or USB, selection of the bus supported by the mirror link is left to a vendor, and the case where communication using USB is offered is likely to increase in view of communication speed or stability. At this time, if a control command may be transmitted and received by using the same bus, a user's time and effort may be reduced. However, when switching to the unique communication mode is performed, there is the case where the mirror link and the control command are not compatible with each other in the same bus, so that the mirror link having a high priority may become disabled (see the example in FIG. 3A).

Figure 12:
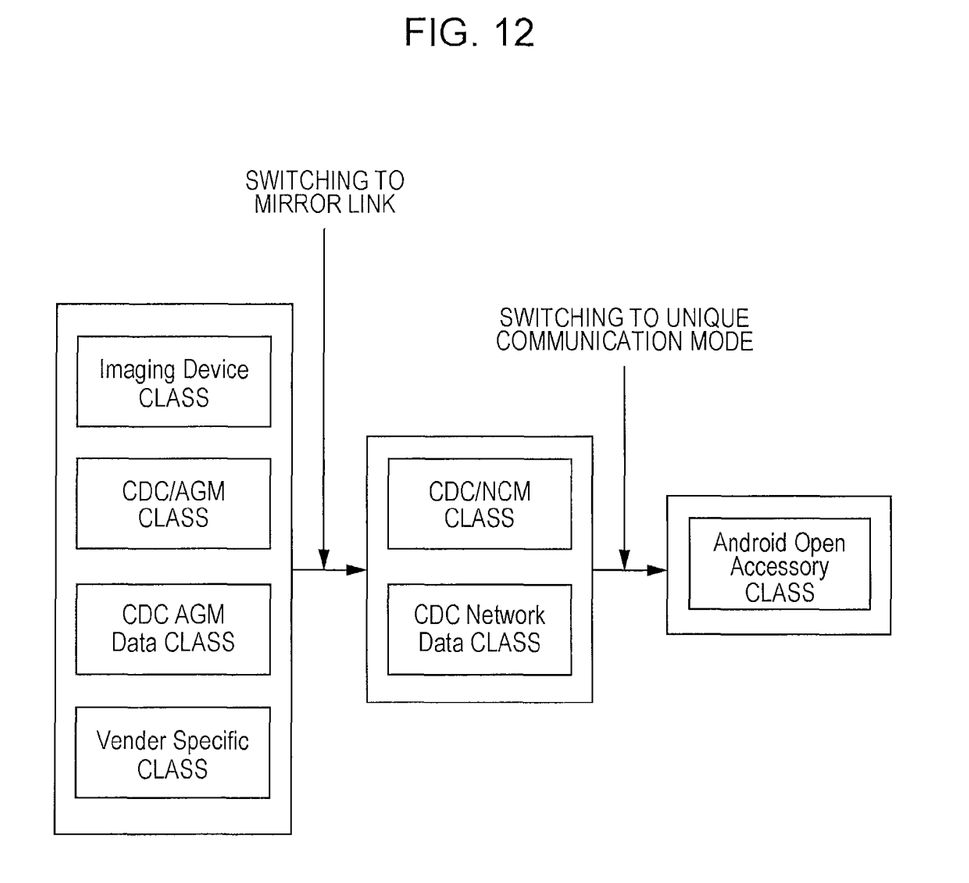
FIG. 12 illustrates changes in device class between before and after switching to a mirror link and between before and after switching to a unique communication mode.

FIG. 12 illustrates an example of SAMSUNG GALAXY SIII. In the specification of this smartphone, classes for a mirror link do not appear in a steady state; whereas, when software for the mirror link is activated, classes appearing in the steady state disappear from sight and the classes (a CDC/NCM class and a CDC network data class) for the mirror link are activated. In this state, when switching to a unique communication mode is performed so as to perform unique communication, the classes for the mirror link disappear. That is, there is a similar problem to that in the example illustrated in FIG. 3A where the mirror link becomes disabled.

Figure 13:
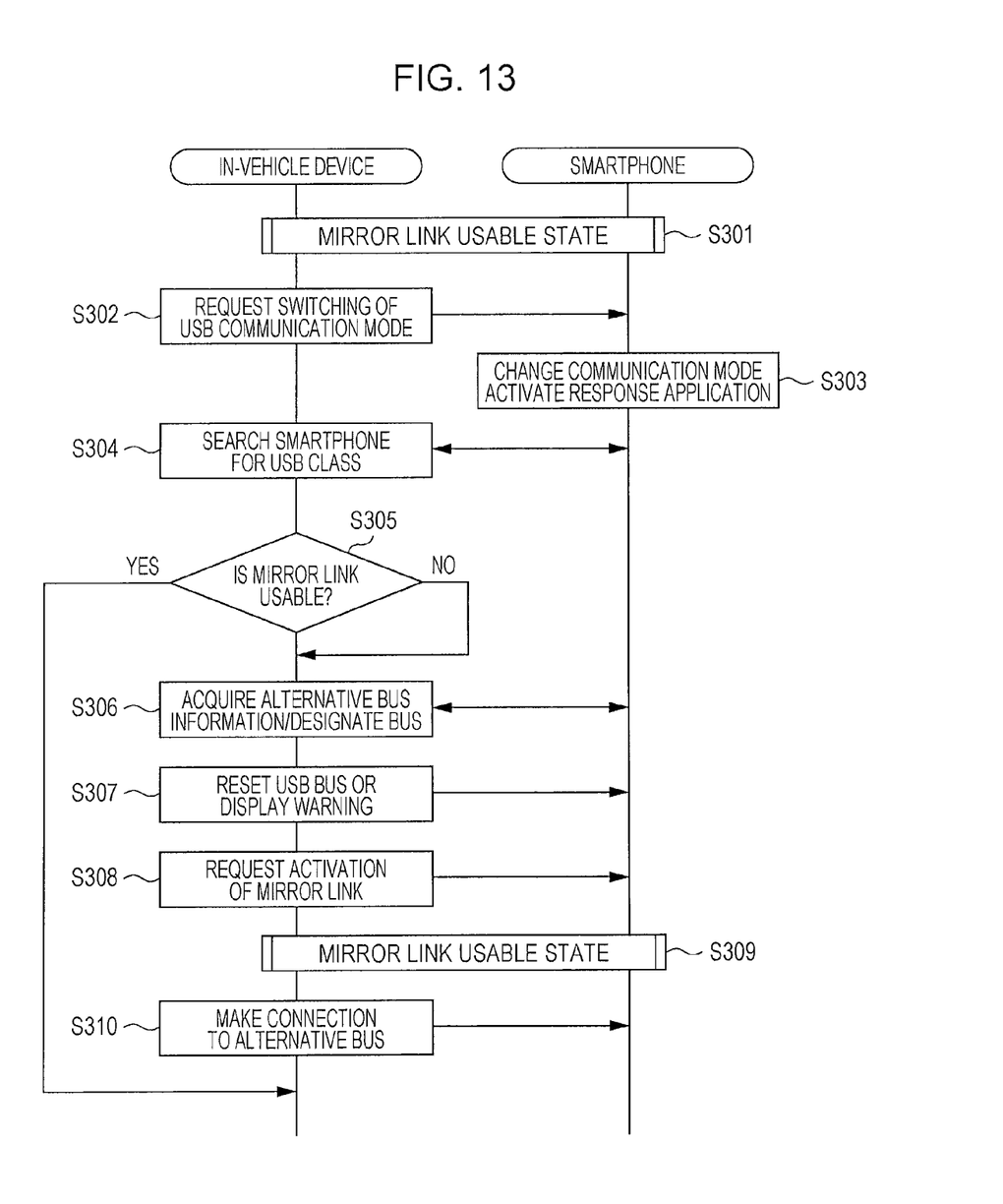
FIG. 13 is a flowchart illustrating communication control according to a second embodiment of the present invention.

In the second embodiment, in the case where the mirror link is usable even if a communication mode is changed, USB communication is continuously performed, and in the case where the mirror link is unusable, a connection to an alternative bus is made. FIG. 13 is a flowchart illustrating communication control according to the second embodiment. A USB connection between the in-vehicle device 110 and the smartphone 120 is made and the mirror link is in a usable state (S301). Here, the communication mode switching request unit 272 of the in-vehicle device 110 makes a request to the smartphone 120 for switching a USB communication mode to the unique communication mode (S302). The smartphone 120 performs switching to the unique communication mode in response to the switching request and activates a response application (S303). The response application is activated automatically if it has been installed in the smartphone 120. If the response application has not been installed, the smartphone 120 accesses an information distribution server and downloads the response application from the server and activates it. The response application has capabilities of providing an alternative bus and providing information required for connection. The response application communicates with and responds to the in-vehicle device 110 when switching to the unique communication mode is performed.

Next, after the request for switching to the unique communication mode has been made, the device class search unit 274 checks whether or not the mirror link is in a usable state (S304). This is checked by acquiring a descriptor as in the first embodiment. Subsequently, the determination unit 276 determines whether or not the mirror link is usable (S305). When the mirror link is usable, the USB communication using a control command is continuously performed by using the same bus and this sequence ends.

On the other hand, when it is determined that the mirror link is not usable, that is, when a disadvantageous change has occurred, the in-vehicle device 110 makes an inquiry to the response application as to whether or not there is an alternative bus that enables the communication using the control command, and acquires alternative bus information required for connection of the alternative bus (S306). Examples of the alternative bus information include Bluetooth profiles, a PIN code, and an IP address/port number in the case of a TCP/IP socket. The in-vehicle device 110 responds to the response application to designate the alternative bus (for example, WiFi or Bluetooth (registered trademark)). The in-vehicle device 110 determines that the communication using the alternative bus may be performed, and resets the USB bus for recovery (S307). Alternatively, the in-vehicle device 110 requests the user to unplug and plug a USB cable once by displaying a warning. Then, the in-vehicle device 110 requests activation of the mirror link (S308) and the response application puts the mirror link into a usable state again in response to the request (S309). Subsequently, the response application opens a line of the alternative bus; whereas, the in-vehicle device 110 performs communication using the unique control command by using Bluetooth (registered trademark), WiFi, or the like on the basis of the alternative bus information (S310).

Figure 14:
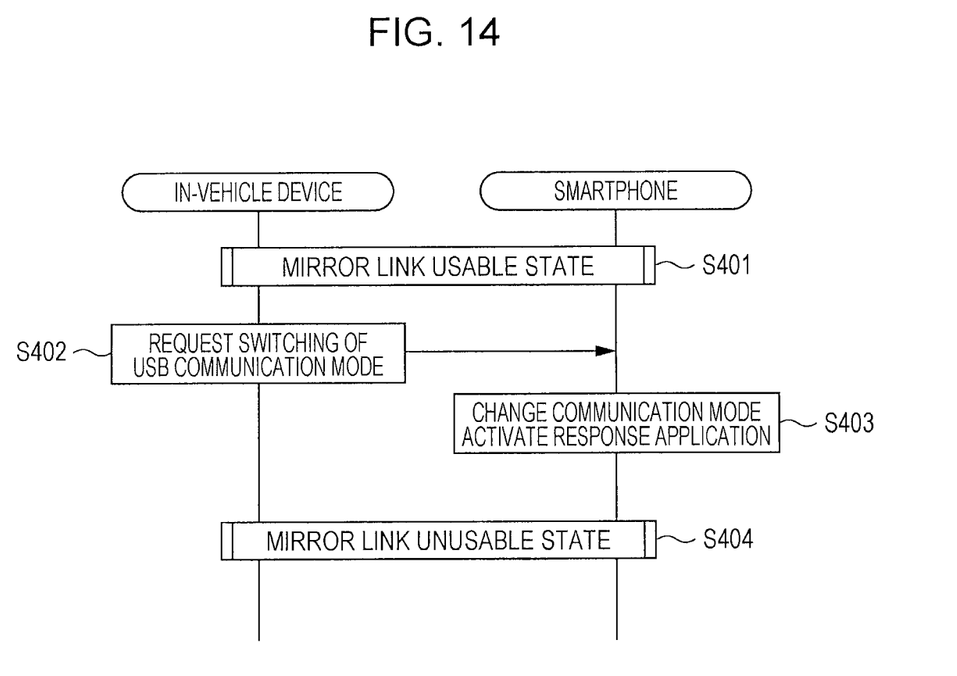
FIG. 14 is a flowchart illustrating an operation performed when the second embodiment of the present invention is not used.

FIG. 14 illustrates an example of communication control performed when the second embodiment of the present invention is not used. In the case where the mirror link is in a usable state and the in-vehicle device 110 is connected to the smartphone 120 (S401), when the in-vehicle device 110 requests switching of a USB communication mode for unique communication control (S402), the smartphone 120 performs switching to the unique communication mode and activates the response application (S403). Thus, the unique communication mode becomes usable; however, because an alternative bus is not prepared, the mirror link is put into an unusable state (S404).

In this way, in the second embodiment, the in-vehicle device 110 makes a request for switching to the unique communication mode to the smartphone 120 in which the mirror link is ready, and the smartphone 120 activates, in response to the switching request, a response application for an in-vehicle device. The response application communicates with and responds to the in-vehicle device 110. When the mirror link is continuously usable after switching as well, communication using a control command is continuously performed by using the same bus, and when the mirror link becomes unusable, the in-vehicle device 110 makes an inquiry to the response application about an alternative bus that enables communication using the control command. The response application provides the alternative bus and then notifies bus information required for connection. The in-vehicle device 110 responds to the response application to designate the alternative bus to be used. Then, the in-vehicle device 110, for example, resets the USB bus and/or requests the user to physically unplug and plug the USB bus once by displaying a warning for the sake of recovery of the mirror link, thereby returning the mirror link to a usable state. Subsequently, because a communication path for the control command is established in the designated bus, in the case where the unique control command and the mirror link may not be able to coexist in the same bus, the in-vehicle device 110 assigns the unique command to another usable bus properly, thereby enabling the coexistence with the mirror link.

In the second embodiment, the example where the mirror link is used as a device class serving as a USB interface is provided. However, the second embodiment may be applied to USB communication using a device class other than the mirror link. In this case as well, in order to cause communication using a unique control command to coexist with the communication using the device class, assignment to an alternative bus may be performed.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. An electronic device that is connectable to an information terminal device, the electronic device comprising:
    a connection unit that enables a USB connection to the information terminal device;
    a first communication mode in which communication with the information terminal device is performed by using a device class prepared in advance in the information terminal device;
    a request unit that makes a request to the information terminal device for switching to a second communication mode which is different from the first communication mode;
    a search unit that searches for a device class usable in the first communication mode after the request for switching to the second communication mode has been made;
    a determination unit that determines, on the basis of a search result of the search unit, whether or not a disadvantageous change has occurred in the first communication mode; and
    a reset unit that enables a reset of the connection unit when the determination unit determines that a disadvantageous change has occurred.

2. The electronic device according to claim 1, further comprising:
    an alternative connection information acquisition unit that acquires alternative connection information regarding a connection which is able to be used instead of the USB connection; and
    an alternative connection unit that enables an alternative connection to the information terminal device on the basis of the alternative connection information after the reset unit has performed the reset.

3. The electronic device according to claim 1, wherein the reset unit provides a warning requesting a user to unplug and plug the connection unit.

4. The electronic device according to claim 1, wherein a determination table indicating a weight of a device class is prepared in advance and the determination unit determines whether or not a disadvantageous change has occurred with reference to the determination table.

5. The electronic device according to claim 1, wherein, when a device class having been used before switching to the second communication mode becomes unusable, the determination unit determines that a disadvantageous change has occurred.

6. The electronic device according to claim 1, wherein, when the number of device classes usable before switching to the second communication mode decreases after switching to the second communication mode, the determination unit determines that a disadvantageous change has occurred.

7. The electronic device according to claim 1, wherein the first communication mode reestablishes communication using the first communication mode after the reset unit has performed the reset.

8. The electronic device according to claim 1, wherein the electronic device operates with a mirror link by using the first communication mode.

9. A communication control method of an electronic device that is connectable to an information terminal device, the communication control method comprising the steps of:
    making a USB connection to the information terminal device;
    communicating with the information terminal device by using a device class prepared in advance in the information terminal device in a first communication mode;
    making a request to the information terminal device for switching to a second communication mode which is different from the first communication mode;
    searching for a device class usable in the first communication mode after making the request for switching to the second communication mode;

determining, on the basis of a search result, whether or not a disadvantageous change has occurred in the first communication mode; and enabling a reset of the USB connection when it is determined that a disadvantageous change has occurred.

10. The communication control method according to claim 9, further comprising the steps of:

acquiring alternative connection information regarding a connection which is able to be used instead of the USB connection; and making a connection to the information terminal device by using an alternative connection on the basis of the alternative connection information after the USB connection has been reset.

11. The communication control method according to claim 9, wherein the step of enabling the reset includes providing a warning requesting a user to unplug and plug the USB connection.

12. The communication control method according to claim 9, wherein, in the step of determining, a determination table indicating a weight of a device class is prepared in advance and it is determined whether or not a disadvantageous change has occurred with reference to the determination table.

13. An information terminal device that is connectable to an electronic device, the information terminal device comprising:

a connection unit that enables a USB connection to the electronic device;

a first communication mode in which communication with the electronic device is performed by using a device class prepared in advance;

a second communication mode that enables communication in the second communication mode in response to a request from the electronic device for switching to the second communication mode which is different from the first communication mode;

a providing unit that provides, to the electronic device, in response to the request for switching to the second communication mode, alternative connection information regarding an alternative connection which is able to be made; and a communication unit that enables communication using the first communication mode and communication using an alternative connection unit between the information terminal device and the electronic device after the connection unit has been reset.

14. The information terminal device according to claim 13, further comprising a response application that is activated in response to the request for switching to the second communication mode, wherein the response application executes the providing unit and the communication unit.

15. The information terminal device according to claim 14, wherein the response application is acquired from an external server in response to the request for switching to the second communication mode.

* * * * *